H. B. COX.
APPARATUS AND METHOD FOR PRESERVING PERISHABLE SUBSTANCES.
APPLICATION FILED OCT. 21, 1920. RENEWED FEB. 24, 1922.
1,418,777. Patented June 6, 1922.
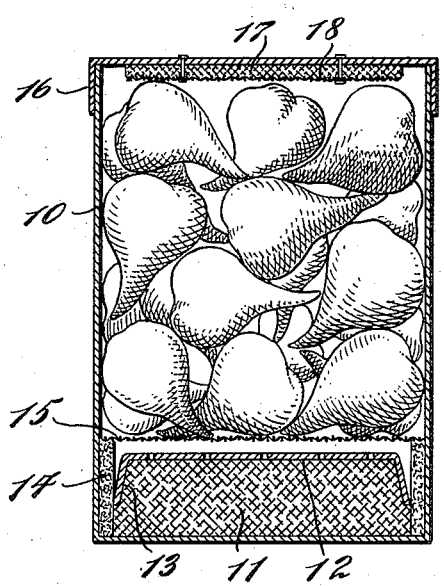
Harry Barringer Cox, INVENTOR.
BY
Gifford & Bull ATTORNEYS

UNITED STATES PATENT OFFICE.

HARRY BARRINGER COX, OF LOS ANGELES, CALIFORNIA, ASSIGNOR, BY MESNE ASSIGNMENTS, TO COX CONSERVADOR COMPANY, OF LOS ANGELES, CALIFORNIA.

APPARATUS AND METHOD FOR PRESERVING PERISHABLE SUBSTANCES.

1,418,777. Specification of Letters Patent. Patented June 6, 1922.

Application filed October 21, 1920, Serial No. 418,464. Renewed February 24, 1922. Serial No. 539,015.

*To all whom it may concern:*

Be it known that I, HARRY BARRINGER COX, a citizen of the United States, and residing at Los Angeles, California, have invented certain new and useful Improvements in Apparatus and Methods for Preserving Perishable Substances, of which the following is a specification.

My present invention relates to apparatus and methods for preserving perishable substances from decay, particularly when such substances are fruits and vegetables.

I have found that when such substances, under suitable conditions, are submitted to forces which I believe to be the vitalizing forces of nature, the decay of such substances can be prevented in a very cheap and effective manner.

In carrying out my invention, I maintain the substances to be preserved in a position where they may be acted on by moisture but out of contact with the fluid source of the moisture. The degree of moisture in the container is found to become approximately that of the substances to be preserved and so remains as long as the substances remain in the container. I have found by actual tests that, by the use of my method and apparatus, vegetable matter in particular, especially in the form of fruits and vegetables, may be preserved from decay for a period of many months. During the time these fruits and vegetables were in my apparatus, the degree of moisture or humidity in the container for these substances remained such that there was no appreciable increase or decrease of the amount of moisture which such fruits and vegetables contained when first picked or removed from the earth.

As an illustrative embodiment of the apparatus which I may use in preserving substances in accordance with my invention, I show in the accompanying drawing an arrangement which I term a "conservador", which comprises a container or receptacle 10 of any desied size or shape, and of any preferred material, such as metal or one of the numerous forms of earthenware, though, preferably, one which is not porous. In the lower part of this container is located a moisture reservoir or "vitalizer" 11 which, in the form illustrated, is a pack of asbestos fibre having preferably a plate 12 which I term the "earth plate" in contact therewith, this earth plate preferably being perforated at a number of points, and, in order to make an effective contact with the reservoir 11, it is preferably provided with downwardly extending edges 13. The moisture reservoir 11 is preferably extended above the surface of the earth plate 12 and, in the form illustrated, this is carried out by using a piece of asbestos felt 14 which constitutes a wick and which extends downward into contact with the fibre 11 and upward above the surface of the earth plate and contacting with the sides 13 thereof.

While I prefer to make the earth plate 12 of metal, it may be of any material adapted to cause it to operate in the manner hereinafter described.

The articles to be preserved are placed in the container 10 and I have found that the best results are obtained when these articles are held above the surface of the earth plate 12. To this end, I provide a foraminous support 15, which may be of any desired material and construction, so long as it has sufficient openings to permit moisture to pass upward therethrough. Preferably, it functions to drain off any moisture on the articles, so that the lowermost portions do not lie in a liquid.

The container 10 is preferably closed by a lid 16 which, however, need not be airtight. I have found that good result may be obtained in some circumstances if a number of small holes or openings at or toward the top of the container 10, or in the closure 16, are provided, these holes being sufficiently small, however, to prevent a definite circulation of the air between the inside and the outside of the container 10.

At the top of the container 10 and, in the form illustrated, attached to the closure 16, I may provide a moisture-absorbent reservoir or "dew pad" 17 to absorb the moisture which rises from the moisture reservoir 11. In the form illustrated, this absorbent reservoir 17 is made up of a pad of asbestos fibre held in place by a piece of wire gauze 18, though it will be understood that this pad may be made up of any suitable material which will absorb the moisture.

In practice, the lower reservoir 11 is made wet without an excess of moisture, water having been found to be effective for this purpose, and the articles to be preserved are placed in the container 10 resting on the support 15. The interior of the container is wiped dry, if any moisture adheres thereto, and the container is closed.

I have found that if the articles contact directly with a metal earth plate 12, the point of contact may be affected so as to produce what appears to be a burn. This is one of the reasons I prefer to maintain the articles out of contact with the earth plate.

After the container is closed for a short time, it is found that the air therein will become saturated to a high degree, with the temperature at the bottom lower than at the top. When fruits and vegetables are in the conservador, their surfaces will become moist to about the same degree only that they are when growing on the trees or plant which produced them, and they will remain in that condition indefinitely so far as tests extending over many months can show, and without any decay or withering of the fruit and vegetables.

One of the functions of the pad 17 is to absorb any excess moisture arising from the reservoir 11 so that it will not collect on the upper surface of the container and fall back in drops. For some purposes, however, this pad may be omitted.

It will be noted that in my preferred form, the walls of the "conservador" are non-absorbent, as will be the cover also, if no dew pad is desired there. Any moisture which may condense on such walls will therefore run back to the moisture reservoir and will not be held on the walls.

Up to the present time, my conservador has been used in a form substantially like that shown in the drawing, the container being formed of an ordinary tin can about six inches in diameter and about nine inches high with an ordinary loose-fitting cover, this cover in some instances being punctured in some half dozen places in the top, the holes being about one-thirty second of an inch in diameter. The moisture reservoir 11 is formed of a pack of asbestos fibre over which the earth plate 12 formed of ordinary tin plate, is placed, this plate being punctured with six or eight small holes about one-eighth inch in diameter. The pad 14 is a strip of asbestos felt inserted around the inner edge of the container and contacting at its lower portion with the asbestos fibre of the pad 11. The support 15 is a piece of coarse wire gauze forced into the container so as to sustain the weight of the substance to be preserved, and keep the latter from contacting with the plate 12.

By the use of a number of such containers, California vegetables, particularly such as potatoes, parsnips, turnips, carrots, tomatoes, peas and string beans, and fruits, such as apples, oranges and lemons, have been preserved for months in southern California, some of them for more than a year. During this period the containers were kept in a dwelling at ordinary living temperatures and the articles did not decay or dry up, so far as could be observed.

These containers with the fruits and vegetables above referred to, therein, have been carried by me across the United States without the condition of the articles being affected, the containers being kept in living rooms during all of that time. Such transportation involved a submission of the substances to the climate of New Orleans for a period of several days.

I claim:—

1. In apparatus for preserving perishable substance from decay, a container for such substances having a moisture reservoir adapted to maintain a degree of moisture in the container approximately that of the contained substances, and means for maintaining the articles out of contact with the fluid in said reservoir and permitting moisture therefrom to pass around the substance.

2. In apparatus for preserving perishable substance from decay, a container for such substance having a moisture reservoir at the bottom adapted to maintain a degree of moisture in the container approximately that of the contained substances, and means for sustaining the articles above the reservoir and out of contact therewith, and permitting moisture therefrom to pass up and around the substances.

3. In apparatus for preserving perishable substance from decay, a container for such substance having a moisture reservoir at the bottom adapted to maintain a degree of moisture in the container approximately that of the contained substances, and means for sustaining the articles above the reservoir and permitting moisture therefrom to pass up and around the substances, the side walls of said container being non-absorbent.

4. In apparatus for preserving perishable substance from decay, a container for such substance having a moisture reservoir adapted to maintain a degree of moisture in the container approximately that of the contained substances, and an absorbent moisture reservoir adapted to absorb moisture passing from said first-named reservoir across the substance.

5. In apparatus for preserving perishable substance from decay, a container for such substance having a moisture reservoir adapted to maintain a degree of moisture in the container approximately that of the contained substances, and an absorbent moisture reservoir adapted to absorb moisture passing from said first-named reservoir across the substance, the side walls of said container being non-absorbent.

6. In apparatus for preserving perishable substance from decay, a container for such substance having a moisture reservoir adapted to maintain a degree of moisture in the container approximately that of the contained substances, and a metallic earth plate adapted to be moistened from said reservoir, and means to prevent contact between the substance and the earth plate.

7. The process of preserving perishable substances from decay which consists in subjecting the same within an enclosure to the evaporation from a source of moisture while holding the same out of contact with the fluid from which the moisture rises and maintaining about the substances a degree of moisture approximately that of the substances to be preserved.

8. The process of preserving perishable substances from decay which consists in subjecting the same within an enclosure to the evaporation from a source of moisture below the substances out of contact therewith and maintaining about the substances a degree of moisture approximately that of the substances to be preserved.

9. The process of preserving perishable substances from decay which consists in subjecting the same within an enclosure to the evaporation from a source of moisture below the substances and out of contact therewith, maintaining about the substances a degree of moisture approximately that of the substances to be preserved, and absorbing the excess moisture after it has passed across the substances.

HARRY BARRINGER COX.